United States Patent
Yasukuni

[11] 4,093,348
[45] June 6, 1978

[54] LENS SYSTEM WITH FRONTAL APERTURE STOP

[75] Inventor: Mitsuo Yasukuni, Sakai, Japan

[73] Assignee: Minolta, Torrance, Calif.

[21] Appl. No.: 689,851

[22] Filed: May 25, 1976

[30] Foreign Application Priority Data

Jun. 3, 1975 Japan .................................. 50/67325

[51] Int. Cl.$^2$ .............................................. G02B 9/34
[52] U.S. Cl. .................................... 350/206; 350/220
[58] Field of Search ................................ 350/206, 220

[56] References Cited

U.S. PATENT DOCUMENTS

| 1,888,156 | 11/1932 | Bielicke | 350/220 |
| 3,011,402 | 12/1961 | Johnson | 350/220 |

FOREIGN PATENT DOCUMENTS

| 49-53,036 | 5/1974 | Japan. |
| 50-26,534 | 3/1975 | Japan. |

*Primary Examiner*—Conrad J. Clark
*Attorney, Agent, or Firm*—Jackson & Jones Law Corp.

[57] ABSTRACT

An objective lens system particularly adapted for photography with a frontal aperture stop is provided. The lens system includes four lens components including a positive doublet. A diaphragm is provided in front of the first lens component and the lens system satisfies the following relationships;

$$1.84 > N_1 > 1.6 \quad (1)$$

$$65 > V_1 > 44 \quad (2)$$

$$0.7 > D_1 + D_2/\Sigma D > 0.3 \quad (3)$$

$$1.5 > |R_3|/R_4 > 0.5 \quad (4)$$

$$0.25 > |N_3 - N_4| > 0.03 \quad (5)$$

$$25 > |V_3 - V_4| > 5 \quad (6)$$

$$0.0005 > N_4 - N_3/R_6 < 0.0035 \quad (7)$$

$$1.0 > R_5/R_7 > 3.0 \quad (8)$$

wherein, N, is the index of refraction, V is the Abbe number, D are axial distances along the optical axis and R is the radii of curvature. The subnumbers refer to consecutive measurements along the optical axis.

13 Claims, 4 Drawing Figures

LENS SYSTEM WITH FRONTAL APERTURE STOP

BACKGROUND OF THE INVENTION

1. Field of the Invention

Present invention relates to an objective lens system for use in photography and more particularly to a lens system that is designed to accommodate a frontal aperture stop.

2. Brief Description of the Prior Art

In an ordinary photographic lens system, a diaphragm is generally interposed between the lenses within the lens assembly, for example as seen in U.S. Pat. No. 3,438,697. Generally the entrance and exit pupils will also be located within the lens assembly and are frequently defined by the lenses themselves. For a more detailed discussion of the design factors for determining the amount of light passing through an optical system and the elements that delineate the portion of the object field actually imaged, reference is made to "Optics: A Short Course for Engineers and Scientists" by Williams et al, Wiley-Interscience, 1972.

For certain photographic apparatus it is sometimes necessary to have an aperture stop provided in the front or the rear of the lens system. For example, when the lens assembly is to be built directly into the camera body, it is necessary, for economic reasons and/or structural design requirements of the camera body, to have a diaphragm, shutter and other mechanisms mounted in front of the lens assembly.

A problem in such a lens system is to provide a sufficiently high aperture ratio while maintaining a normal photographic field angle and finally providing satisfactory compensations for aberrations. The prior art has found it difficult to increase the diameter of the lenses in the rear components of the lens systems, and further a problem to establish a satisfactory balance between the spherical aberration and astigmatism particularly when the aperture ratio or lens opening is to be increased. As is well known, the size of the aperture determines the amount of volume of light reaching the film from a given subject. A high aperture ratio lens system with a frontal aperture stop providing a brightness of F2 or greater while maintaining a normal photographic field of angle of approximately 45° with a satisfactory compensation for aberrations, has been difficult to achieve in the prior art.

SUMMARY OF THE INVENTION

An object of the present invention is to provide a high aperture ratio lens system utilizing a frontal aperture stop with a brightness of F2 or greater and a photographic field angle of approximately 45°. This is accomplished with a minimal number of lens, viz., five lens elements in four separate components.

The first component being a positive refracting lens element, the second component being a bi-concave lens element, the third component comprising a positive doublet consisting of a negatively refracting lens element and a positively refracting lens element and the final fourth component comprising a positive refracting lens element. The diaphragm is positioned in front of the first lens component and the parameters of the lens system satisfy the following relationships;

$$1.84 > N_1 > 1.6 \tag{1}$$

$$65 > V_1 > 44 \tag{2}$$

$$0.7 > D_1 + D_2/\Sigma D > 0.3 \tag{3}$$

$$1.5 > |R_3|/R_4 > 0.5 \tag{4}$$

$$0.25 > |N_3 - N_4| > 0.03 \tag{5}$$

$$25 > V_3 - V_4 > 5 \tag{6}$$

$$0.0005 < N_4 - N_{36} < 0.0035 \tag{7}$$

$$1.0 < R_5/R_7 < 3.0 \tag{8}$$

wherein, N is the index of refraction, V is the Abbe number, D is the axial distances and R is the radius of curvature. The sub-numbers refer to consecutive lens element positions or consecutive physical measurements from the object to image side of the lens system or from the left to right side of the illustrated drawings.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENTS

The following description is provided to enable any person skilled in the optical art to make and use the invention and sets forth the best mode contemplated by the inventor of carrying out his invention. Various modifications, however, will remain readily apparent to those skilled in the art, since the generic principles of the present invention have been defined herein specifically to provide a lens system with a frontal aperture stop that can be manufactured in a relatively economical manner.

The present invention represents the parameters of a compromise balance of acceptable aberrations in a relatively easily manufactured and low cost lens system for utilization with a camera.

In the accompanying drawings which supplement the following tables, the lenses in accordance with the present invention are illustrated diagramatically. As usual, in conventional lens diagrams, the light is assumed to travel from left to right. The individual lenses are designated by a Roman numeral. The aperture stop in the figure is indicated by the letter S. The radii of curvature of the lenses are indicated by R, with a subscript corresponding to the consecutive numbers of the lens elements.

In the tables, minus signs indicated surfaces concave toward the object side, while the surface without a sign is convex toward the object side. The tables also disclose the axial spacings, D, along the optical axis and include both the axial spacings between the lens elements and the thickness of the lens elements. Zero axial spacing indicates lens elements cemented to each other. Since the specific lens perimeters are provided herein to meet the requirements of a full disclosure adequate to convey the present invention to a lens designer, they should not be construed as limiting to any specific lens design set forth in any individual embodiment.

Figure 1:
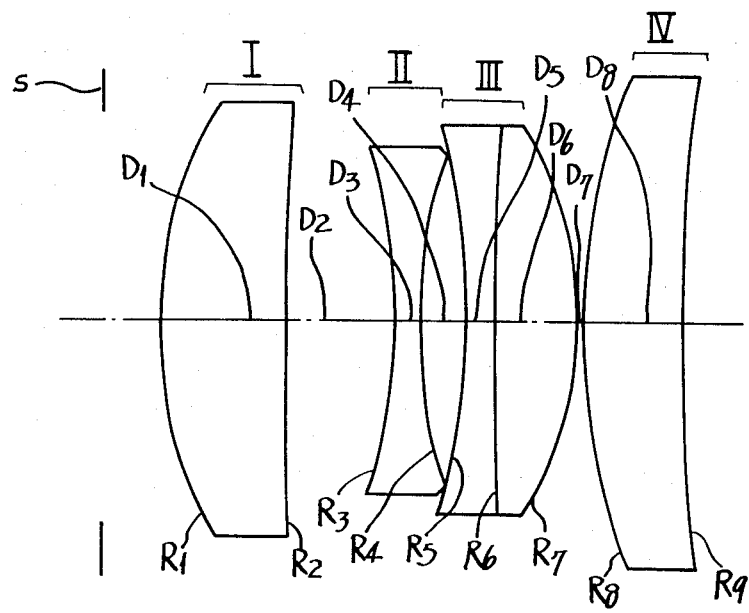
FIG. 1 is a schematic view of one embodiment of the present invention.

Referring to FIG. 1, a first embodiment of the present invention is disclosed. The lens assembly comprises four lens components, including a doublet so that individually five lens elements are provided. A front aperture stop, S, is positioned before the first lens element, I, and has a positive refracting power. The second lens component, II, is of a biconcave configuration. The third lens element, III, comprises a positive doublet consisting of a negative refracting lens element and a positive refracting lens element. The final and fourth lens component, IV, is of a positive refractive power.

The lens system of the present invention satisfies the following equations.

$$1.84 > N_1 > 1.6 \tag{1}$$

$$65 > V_1 > 44 \tag{2}$$

$$0.7 > D_1 + D_2/\Sigma D > 0.3 \tag{3}$$

$$1.5 > |R_3|/R_4 > 0.5 \tag{4}$$

$$0.25 > |N_3 - N_4| > 0.03 \tag{5}$$

$$25 > |V_3 - V_4| > 5 \tag{6}$$

$$0.0005 < N_4 - N_3/R_6 < 0.0035 \tag{7}$$

$$1.0 < R_5/R_7 < 3.0 \tag{8}$$

Wherein, N is the index of refraction, V is the Abbe number, D is the axial distance and R is the radii of curvature. The above equation 7 represents the range for a focal length of $f = 26.0$. An equivalent focal length, $f$, known by optical designers is based on a proportional dimensional design system with $f = 1.0000$, see U.S. Pat. No. 3,874,771, and can modify this equation to the following range values:

$$0.013 \phi > N_4 - N_3/R_6 > 0.09 \phi \tag{7}$$

wherein $\phi$ represents the refractive power of the lens system.

Referring specifically to equation 1, the index of refraction, $N_1$ for the first lens component is greater than 1.6. By adhering to this parameter it is possible to provide for satisfactory compensations for aberrations, particularly spherical aberrations in a high aperture ratio lens system having a brightness of F2 or greater and a field angle of approximately 45°. If the index of refraction for the first lens component is below 1.6, then spherical aberrations are increased in a high aperture ratio lens system to the point where they would be extremely difficult to correct in a relatively simple lens system. In addition, because the overall refracting power of the first lens component is comparatively high, any violation of the lower limit of the first equation would introduce difficult problems in attempting to compensate adequately for the Petsval sum of the entire system.

In equation 2, the Abbe number, $V_1$, of the first lens component must be larger than 44. This requirement is necessary in order to compensate for chromatic aberrations and more particularly longitudinal chromatic aberrations. If the Abbe number of the first component is not maintained above this lower limit, then it becomes impossible for the lens components succeeding the first lens component to fully compensate for longitudinal chromatic aberration and further it becomes difficult to maintain a balance between the longitudinal chromatic aberration and the lateral chromatic aberration.

If the ratio of $(D_1 + D_2)$ to the sum of the total axial distances of the system, that is from the front surface of lense element I to the rear surface of lens element IV is not within the parameters of equation 3, it would be extremely difficult to establish a balance between the axial and off-axial aberrations. This occurs because the off-axial rays will pass through the marginal area of the positive doublet of the third lens component and also of the positive fourth lens component. Failure to stay within the lower limit makes it difficult to compensate for off-axial aberrations, while failure to stay within the upper limit makes the compensation of spherical aberration extremely difficult. If the sum of the thickness, $D_1$, of the positive first lens component, and the air space, $D_2$, between the first and second lens components becomes too large in relationship to the overall focal length of the first component, the compensation for the aberrations particularly the spherical aberration and coma generated by the first lens component is very difficult. If the sum of these two distances are reduced beyond the parameters of equation 3, for example in an attempt to reduce the lens diameter of the rear components to obtain a compact overall lens system, then the reflecting powers of the lenses would have to be increased and this renders the compensation for aberrations extremely difficult.

The ratio of the absolute value of the radii of the first surface of lens element 2, $R_3$, to that of the rear surface, $R_4$, is useful in determining a correct balance for both spherical aberration and astigmatism. A proper determination of the radii, $R_3$, assists in providing a satisfactory compensation for the spherical aberration generated in the positive lens of the first component. The rear surface, $R_4$, is effective in the compensation of off-axial aberrations, particularly astigmatism.

The choice of the glass for both the negative and positive lens elements of the doublet is important, not only in obtaining an appropriate Petsval sum but also to compensate for both spherical and astigmatic aberrations. In equation 5, the range of values indicate the higher degree of refraction capable in the third lens element is disclosed. By satisfying this equation, satisfactory compensation can be obtained from various aberrations. The requirements of equation 5 is particularly necessary for obtaining an appropriate Petsval sum. Further, the requirement of equation 5 provides the intermediate surface of the doublet an adequate refractive power to compensate for spherical and astigmatic aberrations.

Equation 6 relates to the relative values of the Abbe number of the negative and positive lens elements of the doublet constituting the third lens component. Failure to maintain this relationship makes it difficult to compensate for chromatic aberrations, particularly the lateral chromatic aberration. If an attempt is made to compensate for chromatic aberrations by only increasing the refracting powers of the intermediate surface of the doublet without adhering to the parameters of equation 6, then the compensations for other aberrations will become inadequate. As can be appreciated, the upper values or limits relating to the refractive indexes and the Abbe numbers relate to the materials available.

Figure 2:
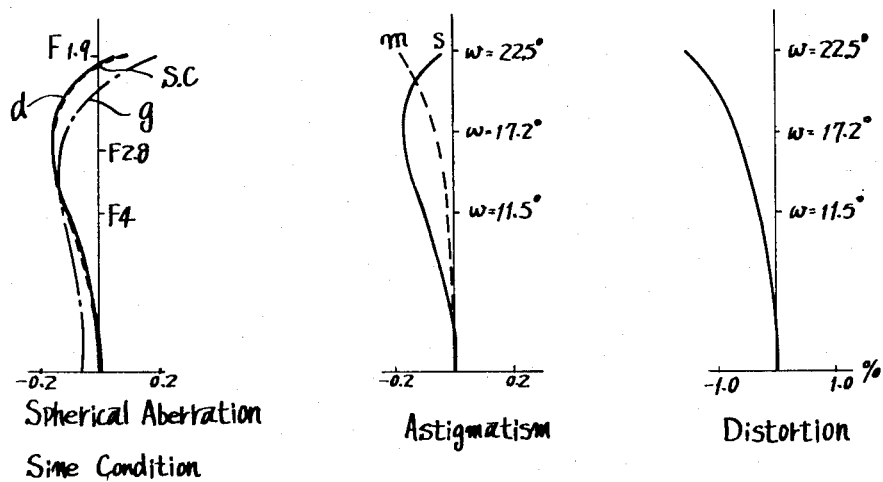
FIG. 2 are graphical plots of sperical aberration, astigmatism and distortion of the lens system of FIG. 1.
Figure 3:
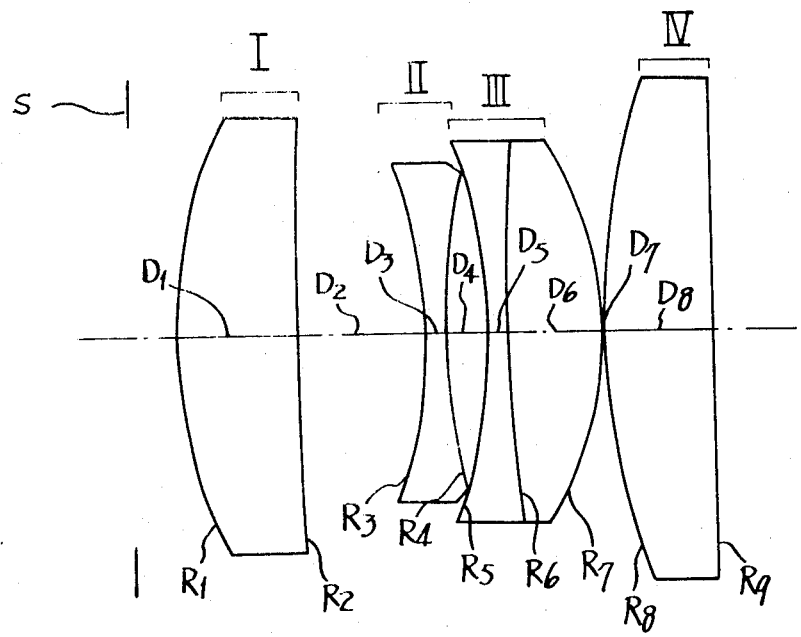
FIG. 3 is a schematic view of a second embodiment of the present invention.
Figure 4:
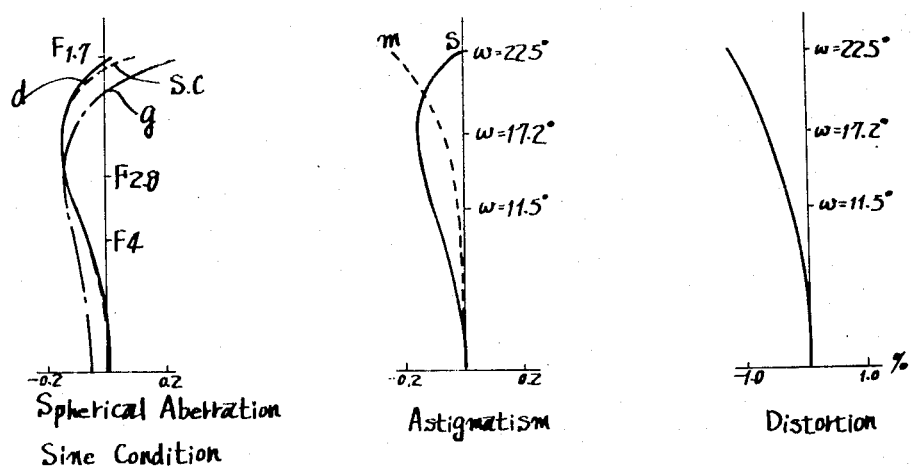
FIG. 4 is a graphical plot of the sperical aberration, astigmatism and distortion of the second embodiment disclosed in FIG. 3.

Equation 7 and 8 relating respectively to ratios relevant to the design parameters of the third lens component or doublet are important for obtaining a balanced compensation for both spherical aberration and astigmatism and also for compensating not only coma but for providing a balanced compensation for both chromatic aberration and coma. A first and second example of the present invention is disclosed as follows in Table 1 and Table 2. The embodiment of Table 2 is disclosed in FIG. 2.

TABLE 1

Example 1
$f = 26.0$   F No. $= 1.9$   Field Angle $2\omega = 44.8°$

| Radius of Curvature | Axial Distance | Refractive Index | Abbe Number |
|---|---|---|---|
| $R_1 = 14.900$ | | | |
| $R_2 = 174.773$ | $D_1 = 4.3$ | $N_1 = 1.69100$ | $V_1 = 54.75$ |
| $R_3 = -17.325$ | $D_2 = 3.7$ | | |
| $R_4 = 18.827$ | $D_3 = 0.9$ | $N_2 = 1.68300$ | $V_2 = 31.52$ |
| $R_5 = 24.507$ | $D_4 = 1.5$ | | |
| $R_6 = 156.406$ | $D_5 = 1.0$ | $N_3 = 1.64769$ | $V_3 = 33.88$ |
| $R_7 = -12.985$ | $D_6 = 2.9$ | $N_4 = 1.77250$ | $V_4 = 49.63$ |
| $R_8 = 21.466$ | $D_7 = 0.15$ | | |
| $R_9 = 71.587$ | $D_8 = 3.4$ | $N_5 = 1.77250$ | $V_5 = 49.63$ |

TABLE 2

Example 2
$f = 26.0$   F No. $= 1.7$   Field Angle $2\omega = 44.8°$

| Radius of Curvature | Axial Distance | Refractive Index | Abbe Number |
|---|---|---|---|
| $R_1 = 17.990$ | | | |
| $R_2 = 243.494$ | $D_1 = 4.569$ | $N_1 = 1.7725$ | $V_1 = 49.60$ |
| $R_3 = -17.104$ | $D_2 = 4.686$ | | |
| $R_4 = 23.697$ | $D_3 = 0.850$ | $N_2 = 1.73300$ | $V_2 = 28.24$ |
| $R_5 = -21.047$ | $D_4 = 1.550$ | | |
| $R_6 = 71.412$ | $D_5 = 0.850$ | $N_3 = 1.63980$ | $V_3 = 34.65$ |
| $R_7 = -13.146$ | $D_6 = 3.450$ | $N_4 = 1.75700$ | $V_4 = 47.73$ |
| $R_8 = 26.746$ | $D_7 = 0.150$ | | |
| $R_9 = -411.188$ | $D_8 = 4.123$ | $N_5 = 1.78831$ | $V_5 = 47.32$ |

By adhering to the parameters and design considerations set forth in the above specification, a lens designer in the optical field is capable of providing a relatively economical and easily manufactured lens system that accommodates a frontal aperture stop.

What is claimed is:

1. A frontal aperture lens system consisting, consecutively from the object to the image side, of:
   an aperture stop,
   a first positive lens component having a front surface convex to the object side,
   a second biconcave lens component,
   a third positive meniscus lens component convex to the image side, and
   a fourth positive lens component having a front surface convex to the object side, characterized in that the third positive meniscus lens component is a doublet consisting of a negative lens and a positive lens which is cemented to the negative lens at the image side thereof.

2. The invention of claim 1, wherein each of the first, second and fourth lens components consists of a single lens.

3. The invention of claim 2, wherein the positive lens of the third lens component is made of a glass of greater refractive index and greater Abbe Number than those of the negative lens of the third lens component.

4. The invention of claim 3, wherein the third lens component fulfills the following conditions:

$$0.25 > |N_3 - N_4| \, 0.03 \quad (1)$$

$$25 > |V_3 - V_4| > 5 \quad (2)$$

$$0.013 \phi < N_4 - N_3/R_6 < 0.09 \phi \quad (3)$$

$$1.0 < R_5/R_7 < 3.0 \quad (4)$$

wherein $N_3$ and $N_4$ represent the refractive index for the negative and positive lenses of the third lens component, respectively; $V_3$ and $V_4$ represent the Abbe Number for the negative and positive lenses of the third lens component, respectively; $\phi$ represents the refractive power of the lens system and $R_5$, $R_6$, and $R_7$ represent the radius of curvature for the front, intermediate and rear surfaces of the third lens component, respectively.

5. The invention of claim 4, wherein the lens system further fulfills the following conditions:

$$1.84 > N_1 > 1.6 \quad (5)$$

$$65 > V_1 > 44 \quad (6)$$

$$0.7 > D_1 + D_2/\Sigma D > 0.3 \quad (7)$$

$$1.5 > |R_3|R_4 > 0.5 \quad (8)$$

wherein $N_1$ and $V_1$ represent the refractive index and the Abbe Number for the first lens component, respectively; $D_1$ represents the thickness of the first lens component on the optical axis; $D_2$ represents the distance between the rear surface of the first lens component and the front surface of the second lens component on the optical axis; $\Sigma D$ represents the sum of the axial distances from the front surface of the first lens component to the rear surface of the fourth lens component; and $R_3$ and $R_4$ represent the radius of curvature for the front and rear surfaces of the second lens component.

6. The invention of claim 1, wherein the F-number of the lens system is less than 2.

7. The invention of claim 1, wherein the third lens component fulfills the following conditions:

$$0.25 > |N_3 - N_4| > 0.03$$

$$25 > |V_3 - V_4| > 5$$

wherein $N_3$ and $N_4$ represent the refractive index for the negative and positive lenses of the third lens component, respectively; and $V_3$ and $V_4$ represent the Abbe Number for the negative and positive lenses of the third lens component, respectively.

8. The invention of claim 1, wherein the third lens component further fulfills the following conditions:

$$0.013\phi < N_4 - N_3/R_6 < 0.09\phi$$

$$1.0 < R_5/R_7 < 3.0$$

wherein $\phi$ represents the refractive power of the lens system; and $R_5$, and $R_6$ and $R_7$ represent the radius of curvature for the front, intermediate and rear surfaces of the third lens component, respectively.

9. The invention of claim 7, wherein the lens system further fulfills the following conditions:

$$1.84 > N_1 > 1.6$$

$$65 > V_1 > 44$$

$$0.7 > D_1 + D_2/\Sigma D > 0.3$$

$1.5 > |R_3|/R_4 > 0.5$

10. The invention of claim 1, wherein the lens system comprises a design parameter of approximate values within the following specifications;

| Radius of Curvature | Axial Distance | Refractive Index | Abbe Number |
|---|---|---|---|
| $R_1 = 14.900$ | | | |
| $R_2 = 174.773$ | $D_1 = 4.3$ | $N_1 = 1.69100$ | $V_1 = 54.75$ |
| $R_3 = -17.325$ | $D_2 = 3.7$ | | |
| $R_4 = 18.827$ | $D_3 = 0.9$ | $N_2 = 1.68300$ | $V_2 = 31.52$ |
| $R_5 = -24.507$ | $D_4 = 1.5$ | | |
| $R_6 = 156.406$ | $D_5 = 1.0$ | $N_3 = 1.64769$ | $V_3 = 33.88$ |
| $R_7 = -12.985$ | $D_6 = 2.9$ | $N_4 = 1.77250$ | $V_4 = 49.63$ |
| $R_8 = 21.466$ | $D_7 = 0.15$ | | |
| $R_9 = 71.587$ | $D_8 = 3.4$ | $N_5 = 1.77250$ | $V_5 = 49.63$ |

11. The invention of claim 1, wherein the lens system comprises a design parameter of approximate values within the following specifications;

| Radius of Curvature | Axial Distance | Refractive Index | Abbe Number |
|---|---|---|---|
| $R_1 = 17.990$ | | | |
| $R_2 = 243.494$ | $D_1 = 4.569$ | $N_1 = 1.7725$ | $V_1 = 49.60$ |
| $R_3 = -17.104$ | $D_2 = 4.686$ | | |
| $R_4 = 23.697$ | $D_3 = 0.850$ | $N_2 = 1.73300$ | $V_2 = 28.24$ |
| $R_5 = -21.047$ | $D_4 = 1.550$ | | |
| $R_6 = 71.412$ | $D_5 = 0.850$ | $N_3 = 1.63980$ | $V_3 = 34.66$ |
| $R_7 = -13.146$ | $D_6 = 3.450$ | $N_4 = 1.75700$ | $V_4 = 47.73$ |
| $R_8 = 26.746$ | $D_7 = 0.150$ | | |
| $R_9 = -411.188$ | $D_8 = 4.123$ | $N_5 = 1.78831$ | $V_5 = 47.32$ |

12. In a multi-lens system for use with a camera having a front aperture stop capable of providing a normal photographic field angle, and having means for the refractive transmittance of a real image including at least four lens elements, the improvement comprising:
a positive doublet formed from a negative and positive lens positioned as a third lens element from an object side having a design parameter within the following ranges;

$$0.25 > |N_3 - N_4| > 0.03 \quad (1)$$

$$25 > |V_3 - V_4| > 5 \quad (2)$$

$$0.013\,\phi < N_4 - N_3/R_6 < 0.09\,\phi \quad (3)$$

$$1.0 < R_5/R_7 < 3.0 \quad (4)$$

wherein $N_3$ and $N_4$ represent the refractive index for the negative and positive lenses of the doublet respectively; $V_3$ and $V_4$ represent the Abbe number for the negative and positive lenses of the doublet, respectively; $\phi$ represents the refractive power of the lens system and $R_5$, $R_6$, and $R_7$ represent the radium of curvature for the front, intermediate and rear surfaces of the doublet, respectively, whereby the correction of spherical aberration, astigmatism, coma and chromatic aberration is improved.

13. The invention of claim 12 wherein the means for the refractive transmittance of a real image further includes a first, second and fourth lens component and satisfies the following conditions;

$$1.84 > N_1 > 1.6 \quad (5)$$

$$65 > V_1 > 44 \quad (6)$$

$$0.7 > D_1 + D_2/\Sigma D > 0.3 \quad (7)$$

$$1.5 > |R_3|/R_4 > 0.5 \quad (8)$$

wherein $N_1$ and $V_1$ represent the refractive index and the Abbe Number for the first lens component, respectively; $D_1$ represents the thickness of the first lens component on the optical axis; $D_2$ represents the distance between the rear surface of the first lens component and the front surface of the second lens component on the optical axis; $\Sigma D$ represents the sum of the axial distances from the front surfaces of the first lens component to the rear surface of the fourth lens component; and $R_3$ and $R_4$ represent the radius of curvature for the front and rear surfaces of the second lens component.

* * * * *

UNITED STATES PATENT AND TRADEMARK OFFICE
CERTIFICATE OF CORRECTION

PATENT NO. : 4,093,348                      Page 1 of 2

DATED      : June 6, 1978

INVENTOR(S) : Mitsuo Yasukuni

It is certified that error appears in the above-identified patent and that said Letters Patent are hereby corrected as shown below:

IN THE ABSTRACT

Equation (7): delete "$0.0005 > N_4 - N_3/R_6 < 0.0035$" and insert --$0.0005 < N_4 - N_3/R_6 < 0.0035$--.

Equation (8): delete "$1.0 > R_5/R_7 > 3.0$" and insert --$1.0 < R_5/R_7 < 3.0$--.

Col. 2, line 9, equation (7): delete "$0.0005 < N_4-N_{36} < 0.0035$" and insert --$0.0005 < N_4 - N_3/R_6 < 0.0035$--.

Col. 5, line 18, Table 1: "$R_1$ through $R_9$" should be aligned vertically.

Col. 5, line 23, Table 1: delete "$R_8=_{21.466}$" and insert --$R_8= 21.466$--.

Col. 5, line 35, Table 2: delete "$V_3 = 34.65$" and insert --$V_3 = 34.66$--.

Col. 5, line 44. Prior to "What is claimed is:" insert the following paragraph --While the parameters of the present invention can be found in the above examples, the examples shoul not be considered limiting but rather illustrative of the advantages of the present invention. Accordingly, the parameters of the present invention should be measured solely from the following claims, in which I claim:--.

UNITED STATES PATENT AND TRADEMARK OFFICE
CERTIFICATE OF CORRECTION

PATENT NO. : 4,093,348

DATED : June 6, 1978

INVENTOR(S) : Mitsuo Yasukuni

It is certified that error appears in the above-identified patent and that said Letters Patent are hereby corrected as shown below:

Col. 6, line 24, equation (8): delete "$1.5 > |R_3|R_4 > 0.5$" and insert --$1.5 > |R_3|/R_4 > 0.5$--.

Col. 8, line 37 delete "front surfaces" and insert --front surface--.

Signed and Sealed this

Second Day of January 1979

[SEAL]

Attest:

RUTH C. MASON
*Attesting Officer*

DONALD W. BANNER
*Commissioner of Patents and Trademarks*